United States Patent [19]

McLaughlin

[11] Patent Number: 4,810,546
[45] Date of Patent: Mar. 7, 1989

[54] GENERAL FLOOR CARPET WITH FLUSH REMOVABLE SECTION

[76] Inventor: John J. McLaughlin, 729 Shore Rd., Somers Point, N.J. 08244

[21] Appl. No.: 104,976

[22] Filed: Oct. 6, 1987

Related U.S. Application Data

[63] Continuation-in-part of Ser. No. 929,261, Nov. 10, 1986, Pat. No. 4,716,065, which is a continuation-in-part of Ser. No. 646,509, Sep. 4, 1984, Pat. No. 4,671,981.

[51] Int. Cl.$^4$ .............................................. B32B 3/06
[52] U.S. Cl. ...................................... 428/62; 428/82; 428/88; 428/95; 428/99; 428/192
[58] Field of Search ................ 428/95, 192, 62, 82, 428/88, 99

[56] References Cited

U.S. PATENT DOCUMENTS

| | | |
|---|---|---|
| 3,817,015 | 6/1974 | Frangos ................................ 428/95 |
| 4,078,109 | 3/1978 | Kando ................................... 428/95 |
| 4,353,944 | 10/1982 | Tarui ................................... 428/192 |
| 4,588,628 | 5/1986 | Roth ................................... 428/95 |
| 4,671,981 | 6/1987 | McLaughlin ......................... 428/95 |

*Primary Examiner*—Marion C. McCamish

[57] ABSTRACT

A removable section of carpet is provided with a zipper or velcro fastener surrounding its border in order that is can be removed, cleaned and then reinserted back in place by joining to the main floor carpet which is fitted with the mated fastener to form a general floor carpet with a flush removable section. The removable carpet may be peninsula-shaped for doorway use and when so shaped the non-fastened side is provided with a hinged clamp for fast release.

A modification permits a removable section of carpet or covering on top of a tiled floor to be lifted out for disposal of the dirt swept onto its surface from the floor through an abutting surrounding apron that ascendingly slopes from the floor to a level equal to or above the removable carpet face. This same general device may be used with carpet having tuft high enough to allow the entry edge of the inclinded apron when adhered to the fixed carpet to be nested so deeply into its face that it will permit all visable dirt swept on and up its surface to pass on to the removable carpet without hindrance. In the case of a non-fastened lift-off carpet (especially for automobiles) one or more sides of the apron leaving edge or one or more sides of the removable carpet entry edge may be made tapered or crimped or the floor of the apron device and the backing of the lift-off section may be ribbed and grooved, with either or all of these cursory alterations performed to hold the removable section in tighter place to the degree that the lift-off and return of the removable carpet may occur only when the lift-off section is slightly bent in the first instance and only in the direction of the grooves in the next.

6 Claims, 3 Drawing Sheets

GENERAL FLOOR CARPET WITH FLUSH REMOVABLE SECTION

BACKGROUND OF THE INVENTION

This application is a continuation in part of Ser. No. 06/929,261 filed 11/10/86 now U.S. Pat. Pat. No. 4,716,065, granted 12/29/87 and which application is a continuation in part of application Ser. No. 646,509 filed 9/4/84, now U.S. Pat. No. 4,671,981 granted 6/9/87. Since the applicant is the same in this application and the aforementioned ones and there is the necessary continuity of pendency present, the benefit of the filing date of the earlier co-pending application is hereby requested.

FIELD OF THE INVENTION

The present invention relates to a removable carpet with a zipper or velcro surrounding border fastener, that is joined to a main, general floor carpet to serve a need for a detachable carpet for home or business, In my application for a Removable Automobile Floor Carpet (application Ser. No. 646,509) no mention was made to a removable general floor carpet. In vehicle carpeting the installation and fitting is done by factory personnel with sophisticated tools and the positioning and binding of the fasteners, necessary to the use of this invention, would be within their skill, whereas the general floor carpet is installed at various sites and difficulties in firmly attaching the fastener as well as forming a precise opening for the removable carpet could be expected.

SUMMARY

In my application 06/929/261 filed 11/10/86 I addressed the fastening part of this scattered sites problem by having the removable carpet mounted on an underlying pad in its entirety; however there will occur times when the removable carpet with its own border fastener coupled to the main carpet in a flush position would be possible and desirable.

Therefore an object of this invention is to provide a removable carpet for hard use general carpet areas such as entranceways, pathways or in front of permanent seating ie toilets, wherein the section would be unzipped or otherwise unjoined from the main general carpet, for removal of debris and a clean section zipped or pressed back into place.

Another object of this invention is to provide a removable carpet for an entranceway that is open to the public and which for that reason collects large amounts of dirt, often wetted by rain or snow. This replaceable carpet would do away with a carpet protector used by many to cover the carpet but which added thickness or wrinkles often interferes with the door swing.

A modification has as its object a means to provide a sill with an independent clamping and releasing action to hold firm or surrender the left alone side of a peninsula shaped removable carpet.

The object of another modification is to provide a removable carpet that would fit over a carpeted or tiled floor and lay snug at rest or detachably join a surrounding inclined apron of suitable plastic or rubber which is adhered to the floor surface so precisely that there is no interference with brushing the dirt up the incline and onto the removable carpet, which carpet would be unfastened or simply lifted off for disposal of the dirt elsewhere. In that latter case the removable carpet could resemble a pebble in a pond, with the surrounding apron mounted on a bed that lies under the carpet; visable only when the carpet is removed.

While the primary object of this invention and its modifications is to provide a removable carpet that will accept dirt swept onto its surface from an ordinary floor carpet for removal of the dirt it may be used in automobile carpeting to complement my Pat. No. 4,671,981 dated June 9, 1987 and titled—REMOVABLE AUTOMOBILE FLOOR CARPET IN THE SAME PLANE AS THE FIXED AUTOMOBILE FLOOR CARPET—or my application now pending—Ser. No. 06/929,261 Filed 11/6/86 and titled UNDERLYING PAD FOR ATTACHING REMOVABLE AUTOMOBILE FLOOR CARPET—of which this invention is a continuation in part.

DESCRIPTION OF THE PREFERRED EMBODIMENTS

The main body of this invention embodies a fixed floor carpet of of all available types including woven or non woven material: To this carpet is formed an opening to accomodate a removable carpet in the same plane as the fixed carpet. The removable carpet is joined to the fixed carpet by a surrounding fastener which may be any type of fastener able to be attached and detached without the need of tools but are herein specifically described as those known as zipper or velcro fasteners. The construction of the joining the two carpets to the fastener should permit repeated separations with the technique for attaching the zipper halves now used in luggage products and new plastic adhesive solutions that enhance life and strength of the gripping action of velcro now being developed regulary.

To the main body of the invention we are providing as a modification, a hold down device for the free end of a peninsula shaped removable carpet. In installing general carpet around doorways the carpet is tacked from below the backing and pressed from above the top surface by a length of strip along the span between the door frame sides, and this attack is a more or less permanent arrangement; too slow and too fragile for repeated separations. In this hold and release modification to this invention we provide a faster release better able to withstand repeated separations. Another modification of this invention is provided for those carpets furnished with tufts having a high profile that can employ a removable carpet joined to an inclined apron which is adhered to the main carpet floor with such gradual obliqueness as to allow swept dirt to enter the removable carpet for lift off cleaning. A similar arrangement for tile or other floors is a part of this modification.

DETAILED DESCRIPTION OF THE PREFERRED EMBODIMENTS

The present invention is now described in detail.

Figure 1:
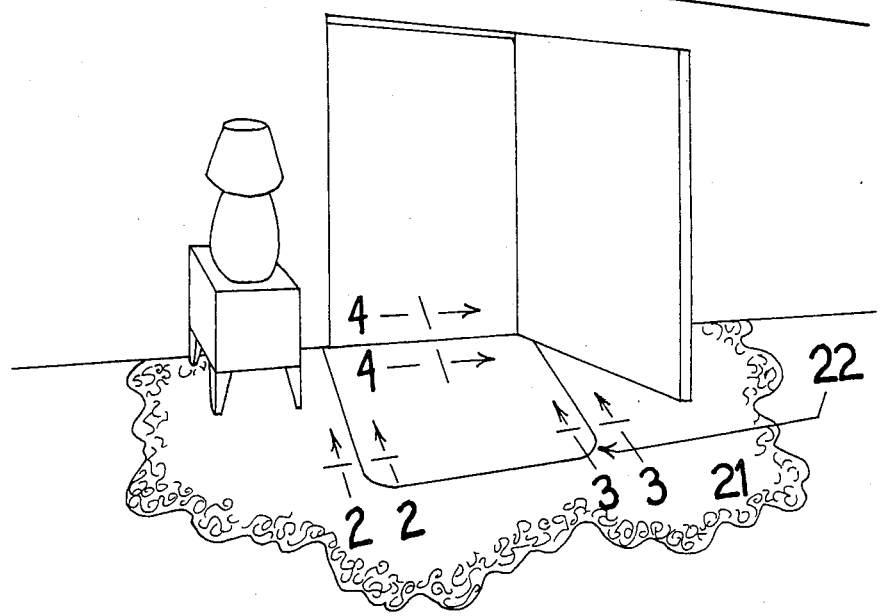
FIG. 1 is a perspective view of an entrance area carpet.

Referring to FIG. 1 which is a perspective view of a general floor carpet 21 joined to a removable carpet 23 at a doorway. In this view the outline of the fastener is left alone on the entry side.

Figure 2:
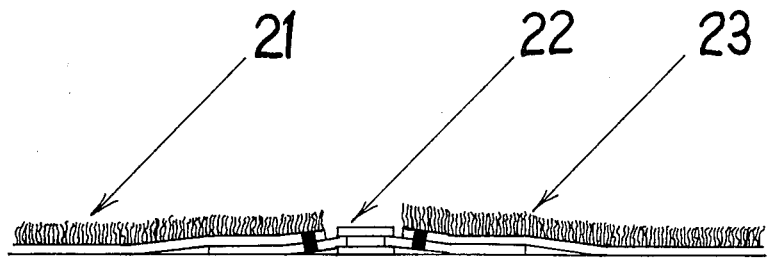
FIGS. 2 & 3 are section views taken along lines 2—2 and 3—3 of FIG. 1.

FIG. 2 indicates in elevation the general configuration surfaces of the fixed floor carpet 21 and the removable carpet 213 separated by a zipper fastener 22 stitched or otherwise adhered to both carpets. The zipper pull tag (not shown) may be magnetized to hold it firmly below the carpet surface when it is in the rest position.

Figure 3:
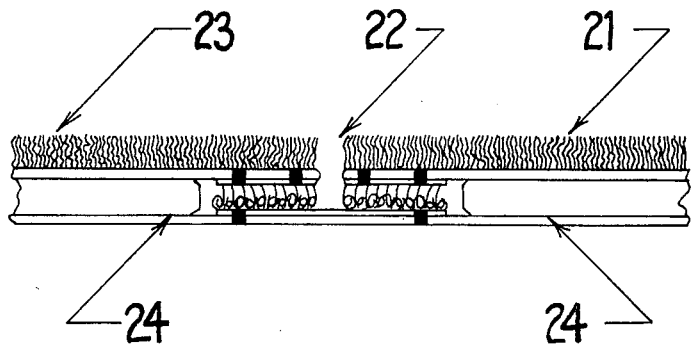

FIG. 3 indicates in elevation the general configuration of the fixed floor carpet 21 and the removable 23 joined together by a velcro fastener 22. The fixed carpet may be adhered to the floor with only the removable carpet employing the velcro but in the view shown here the lower half of the velcro fastener 22 is wide enough to engage two separated top halves; one stitched or glued to the removable carpet 23 and the other to the fixed carpet 21. In operation it would be required to press down the fixed carpet and at the same time raise away the removable carpet. In the event the fixed carpet is installed over a pad 24 the removable carpet may also use a pad 24 to keep the carpets flush. Such pads keep the full tread weight off the fastener and prolong its usefulness. The pads may be made of jute or similar resilient material.

Figure 4A:
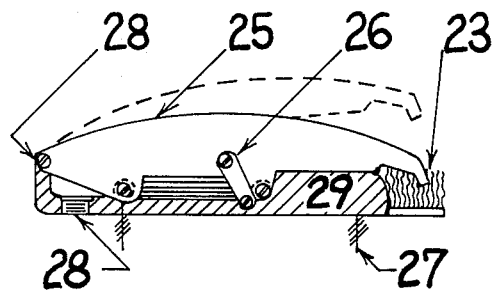
FIGS. 4a & 4b are section views similar to FIG. 4 but showing modifications of that structure.
Figure 4B:
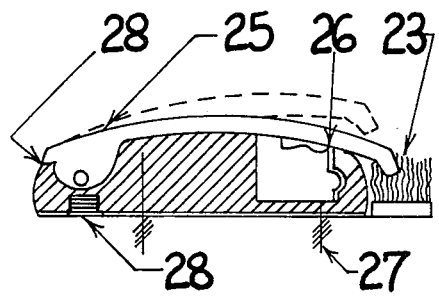
Figure 4:
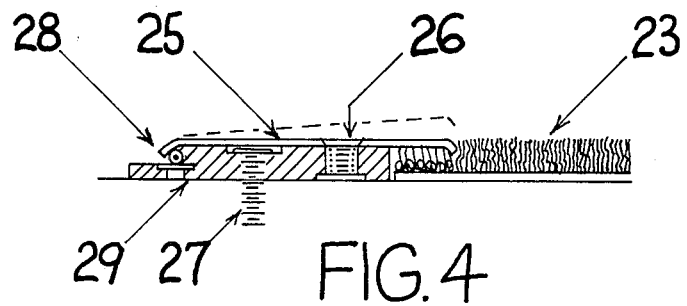
FIG. 4 is a section view of lines 4—4 of FIG. 1 showing a clasp engaging a removable carpet.

FIG. 4 is a sectional of a removable carpet employed in a doorway position with its entry side left alone. To hold this unfastened side and protect its uncovered end surface is employed a still 29 formed of wood or material equally as firm and attached permanently to the floor by one or more line of screws 27 and to which sill 29 the removable carpet 23 abuts. Along and on top of the sill 29 is a continuous strip 25 formed of stainless steel, brass or plastic which protrudes beyond the sill and bends into the removable carpet 23 when clamped. The strip material must be of enough gauge to withstand foot and wheeled traffic as will as denting from thumps. The strip 25 is held clamped by a hold down device 26 which is this view is a screw and insert arranged in a line at intervals. The strip 25 is joined to the sill 29 by a hinge 28.

FIG. 4a is another sectional view of a removable carpet 23 employed in a doorway, with its entry side left alone. It too, uses a sill 29 formed of wood or plastic and threaded permanently to the floor by one or more lines of screws 27 to which the removable carpet abuts. Along and on top of the sill and protruding beyond it into the removable carpet 23 is a formed continuous strip 25 as described in FIG. 4 fastened by a hinge 28 and employing at intervals a hold down device 26 utilizing a cam to which frame arms are bolted eccentrically to it and to the sill 29. Rising the strip to remove the carpet turns the cam and frees the arms, pressing the strip to hold the carpet locks the arms.

FIG. 4b is still another sectional view of a removable carpet 23 in a doorway and again employes a sill 29 attached permanently to the floor by one or more lines of screws 27 to which the removable carpet 23 abuts. Along the top of the sill and protruding beyond it into the removable carpet 23 is a continuous strip 25 as described in FIG. 4 fastened to the sill by a hinge 28 and employing at intervals a hold down device 26 consisting of a spring that locks into a recess formed in the sill 29. When the strip 25 is pried above the removable carpet 23 the carpet may be taken away; when returned—pressing down on the hinged strip allows the spring 26 to fit a recess in the sill holding the strip and consequently the removable carpet in place.

Figure 5:
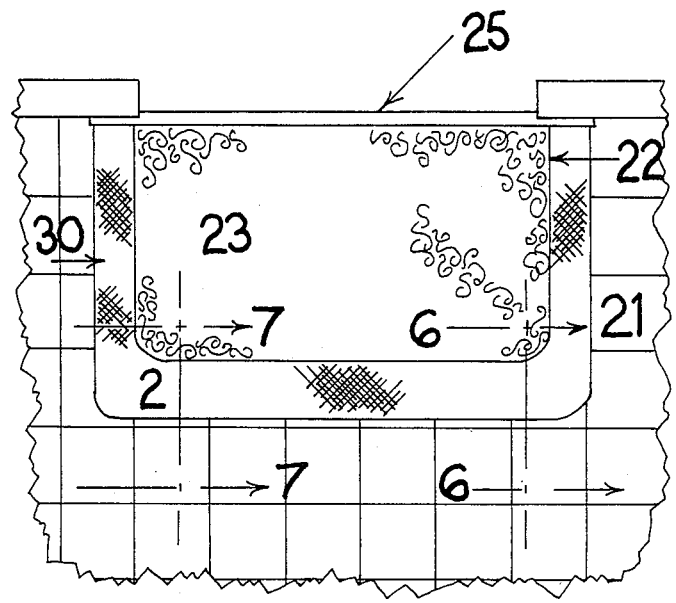
FIG. 5 is an overhead (plan) view of a doorway removable carpet and apron on a tile floor.

FIG. 5 refers to a plan view of a removable carpet 23 positioned at a doorway and mounted over a tile floor 21. In the span between the tile floor 21 and the removable carpet 23 is an outline of an apron 30 obliquely inclined, to the degree that its leading edge forms a point. The removable carpet side abutting the doorway is left alone, held clamped by a continuous strip 25 described previously, and whose other 3 sides are fastened detachably 22 for lift off disposal of the debris brushed up and over the inclined apron 30.

Figure 6:
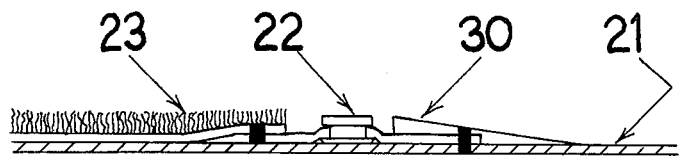
FIGS. 6 & 7 are section views along lines 6—6 and 7—7 Of FIG. 5.

FIG. 6 is a sectional view of lines 6—6 of FIG. 5 and shows a zipper fastener 22 joined to the underside of the trailing edge of the inclined apron 30 which in turn is adhered to the tile floor 21. Should the tiles be removed in this area to accomodate the removable carpet 23, the apron 30 may rest on the floor 21 and the leading and feathered edge of the inclined apron 30 would start below the top surface of the tile floor remaining.

Figure 7:
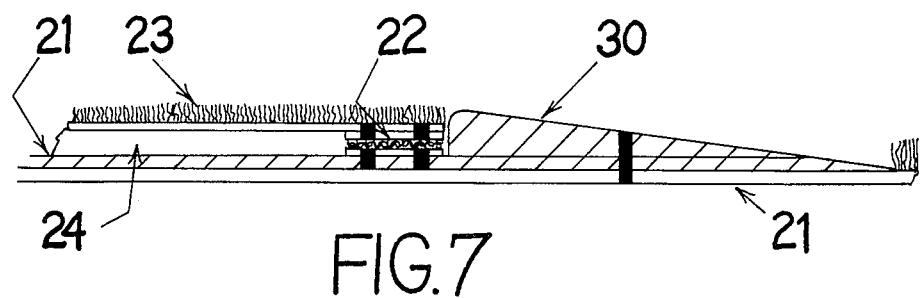

FIG. 7 is similar to FIG. 6 with the inclined apron 30 adjacent to the removable carpet 23 and adhered above the tile floor 21. The removable carpet 23 is held in place by a velcro fastener 22 and a pad 24 under the removable carpet prevents sagging. The carpet face may be tufted or smooth and the surrounding inclined apron 30 may be made of a continuous floor as shown for rigidity.

Having described the preferred embodiments I claim:

1. In Combination—a fixed general floor carpet provided with an opening consisting of three sides plus a border, formed in an area that dirt habitually gathers—a removable carpet having the same plane as the fixed carpet inserted into the fixed carpet opening, for lift-off and shake-loose disposal of the dirt swept onto its surface from the surrounding fixed general floor carpet.

2. The device of claim 1 in which the opening formed on the three sides of the fixed general floor carpet is furnished with one side of a separating fastener and the abutting edges of the removable carpet are furnished with the mated side and when enjoined both carpets become one piece.

3. In Combination—a fixed general floor carpet over which is adhered settled into the tuft—a rubber or plastic inclined frame that surrounds—a removable carpet resting on the fixed general floor carpet and with the combination forming two pieces held intact and with the leading edge of the surrounding inclined frame able to accept swept dirt from the fixed general floor carpet at its elevation and deposit it up and over the trailing edge of the surrounding inclined frame onto the surface of the removable carpet, at its higher elevation for the purpose of lift-off and shake-loose disposal of the debris.

4. The device of claim 3 in which the rubber or plastic inclined frame that surrounds the removable carpet would have a reinforcement floor of similar material to increase rigidity or wear-life.

5. The device of claim 3 wherein said removable carpet and said fixed general floor carpet are automobile carpets.

6. The device of claim 3 in which the removable carpet is made with one side of an attached border fastener and the corresponding abutting edges of the surrounding inclined frame have attached its mated side and when enjoined both carpets become one piece.

* * * * *